(12) United States Patent
Iyer et al.

(10) Patent No.: US 8,635,630 B2
(45) Date of Patent: Jan. 21, 2014

(54) APPLICATION LIFETIME MANAGEMENT

(75) Inventors: Anand B. Iyer, Sammamish, WA (US);
Michael H. Krause, Redmond, WA (US); Haseeb Ahmed, Redmond, WA (US); Yunfei Shang, Bothell, WA (US); Kumneger T. Zelalem, Bellevue, WA (US); Zinaida A. Pozen, Seattle, WA (US); Hui Huang, Redmond, WA (US); Yau N. Chin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 12/911,450

(22) Filed: Oct. 25, 2010

(65) Prior Publication Data

US 2012/0102504 A1  Apr. 26, 2012

(51) Int. Cl.
*G06F 9/22* (2006.01)

(52) U.S. Cl.
USPC ............ 719/318; 718/103; 718/104; 710/110

(58) Field of Classification Search
None
See application file for complete search history.

(56) References Cited

U.S. PATENT DOCUMENTS

| | | | |
|---|---|---|---|
| 4,224,664 A | 9/1980 | Trinchieri | |
| 6,148,408 A | 11/2000 | Shimoda | |
| 6,834,386 B1 | 12/2004 | Douceur et al. | |
| 6,910,210 B1 * | 6/2005 | Chew | 718/103 |
| 7,584,376 B2 | 9/2009 | Finkelstein et al. | |
| 7,853,812 B2 | 12/2010 | McBrearty et al. | |
| 8,275,802 B2 | 9/2012 | Mewhinney et al. | |
| 2003/0187857 A1 | 10/2003 | Ford | |
| 2005/0068311 A1 * | 3/2005 | Fletcher et al. | 345/211 |
| 2005/0177832 A1 | 8/2005 | Chew | |
| 2006/0136882 A1 | 6/2006 | Noonan et al. | |
| 2007/0245163 A1 | 10/2007 | Lu et al. | |
| 2008/0085717 A1 * | 4/2008 | Chhabra et al. | 455/450 |
| 2008/0109886 A1 | 5/2008 | Matsumoto et al. | |
| 2008/0168235 A1 | 7/2008 | Watson et al. | |
| 2008/0244616 A1 | 10/2008 | Brunswig et al. | |
| 2009/0019440 A1 | 1/2009 | Ando | |
| 2009/0113444 A1 | 4/2009 | Hackborn et al. | |
| 2009/0307696 A1 | 12/2009 | Vals et al. | |
| 2010/0011198 A1 | 1/2010 | Hooker et al. | |
| 2010/0017506 A1 * | 1/2010 | Fadell | 709/224 |
| 2010/0023788 A1 | 1/2010 | Scott et al. | |
| 2010/0248843 A1 | 9/2010 | Karsten | |
| 2011/0191445 A1 | 8/2011 | Dazzi | |
| 2012/0144331 A1 | 6/2012 | Tolonen et al. | |
| 2013/0047198 A1 | 2/2013 | Srour | |

OTHER PUBLICATIONS

Loc-nguyen, Developing power aware applications using D-Bus, Apr. 2, 2009 pp. 1-10.*

(Continued)

*Primary Examiner* — H S Sough
*Assistant Examiner* — Syed Roni
(74) *Attorney, Agent, or Firm* — Wolfe-SBMC

(57) ABSTRACT

In a computing device running multiple applications, a check is made as to whether a threshold value of multiple threshold values has been met. Each of the multiple threshold values is associated with a characteristic of one of the multiple applications or a characteristic of a resource of the computing device. If the threshold value has not been met, then the multiple applications are allowed to continue running on the computing device. However, if the threshold value has been met, then one or more of the multiple applications to shut down is selected based at least in part on the characteristic associated with the threshold value that has been met, and the selected application is shut down.

19 Claims, 5 Drawing Sheets

(56) References Cited

OTHER PUBLICATIONS

Paranjpe, Nitin Dr., "Effective use of Task Manager", Retrieved at << http://www.expresscomputeronline.com/20030915/techspace01.shtml >>, Sep. 15, 2003, pp. 4.

"Application Fundamentals", Retrieved at << http://developer.android.com/guide/topics/fundamentals.html >>, Sep. 23, 2010, pp. 17.

"Shutdown Inactive Application", Retrieved at << http://www.bigresource.com/VB-Shutdown-Inactive-Application-OBBAf2TBX1.html >>, Sep. 23, 2010, pp. 9.

Banerjee, Amit, "Automatically Close Inactive Windows, Programs and Tasks with JustCloseSomeTasks", Retrieved at << http://www.ampercent.com/automatically-close-inactive-windows-programs-tasks/1300/ >>, Sep. 23, 2010, pp. 2.

"International Search Report", Mailed Date: May 29, 2012, Application No. PCT/US2011/054514, Filed Date: Oct. 2, 2011, pp. 9.

Chang, Ming-Wei et al., "Implementation and Optimization of DSP Suspend Resume on Dual-Core SOC", *ICESS '09*, May 25-27, 2009, available at <http://ieeexplore.ieee.org/stamp/stamp.jsp?tp=&arnumber=5066647>,(May 25, 2009), pp. 185-190.

"Non-Final Office Action", U.S. Appl. No. 13/213,540, (Feb. 28, 2013), 10 pages.

"Restriction Requirement", U.S. Appl. No. 13/213,540, (Feb. 4, 2013), 6 pages.

"Final Office Action", U.S. Appl. No. 13/213,540, (Jul. 11, 2013), 17 pages.

\* cited by examiner

APPLICATION LIFETIME MANAGEMENT

BACKGROUND

Computing devices can run multiple applications concurrently. As the number of applications running concurrently increases, the usage of various computing device resources (such as processors, memory, etc.) can also increase. These applications can continue to use the computing device resources even if the applications are not being actively used by a user of the computing device. This can be problematic because the usage of the computing device resources by the multiple concurrently running applications can degrade the performance of the computing device, which can lead to frustrating and unpleasant user experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device running multiple applications, a check is made as to whether a threshold value of multiple threshold values has been met. Each of the multiple threshold values is associated with a characteristic of one of the multiple applications or a characteristic of a resource of the computing device. If the threshold value has not been met, then the multiple applications are allowed to continue running on the computing device. However, if the threshold value has been met, then one or more of the multiple applications to shut down is selected based at least in part on the characteristic associated with the threshold value that has been met, and the selected application is shut down.

In accordance with one or more aspects, a list of background applications running on the computing device is generated. The list of background applications is prioritized based at least in part on usage of a resource of the computing device by the background applications on the list. An application on the list of background applications is selected, and the selected application is shut down.

BRIEF DESCRIPTION OF THE DRAWINGS

The same numbers are used throughout the drawings to reference like features.

DETAILED DESCRIPTION

Application lifetime management is discussed herein. Various characteristics of applications and/or computing device resources are monitored, such as application age, processor usage, memory usage, and so forth. Each of these monitored characteristics has an associated threshold value, and if at least one of the threshold values is met then one or more applications are selected to be automatically shut down. The one or more applications that are selected to be automatically shut down are based at least in part on the threshold value that was met and the characteristic associated with that threshold value.

Figure 1:
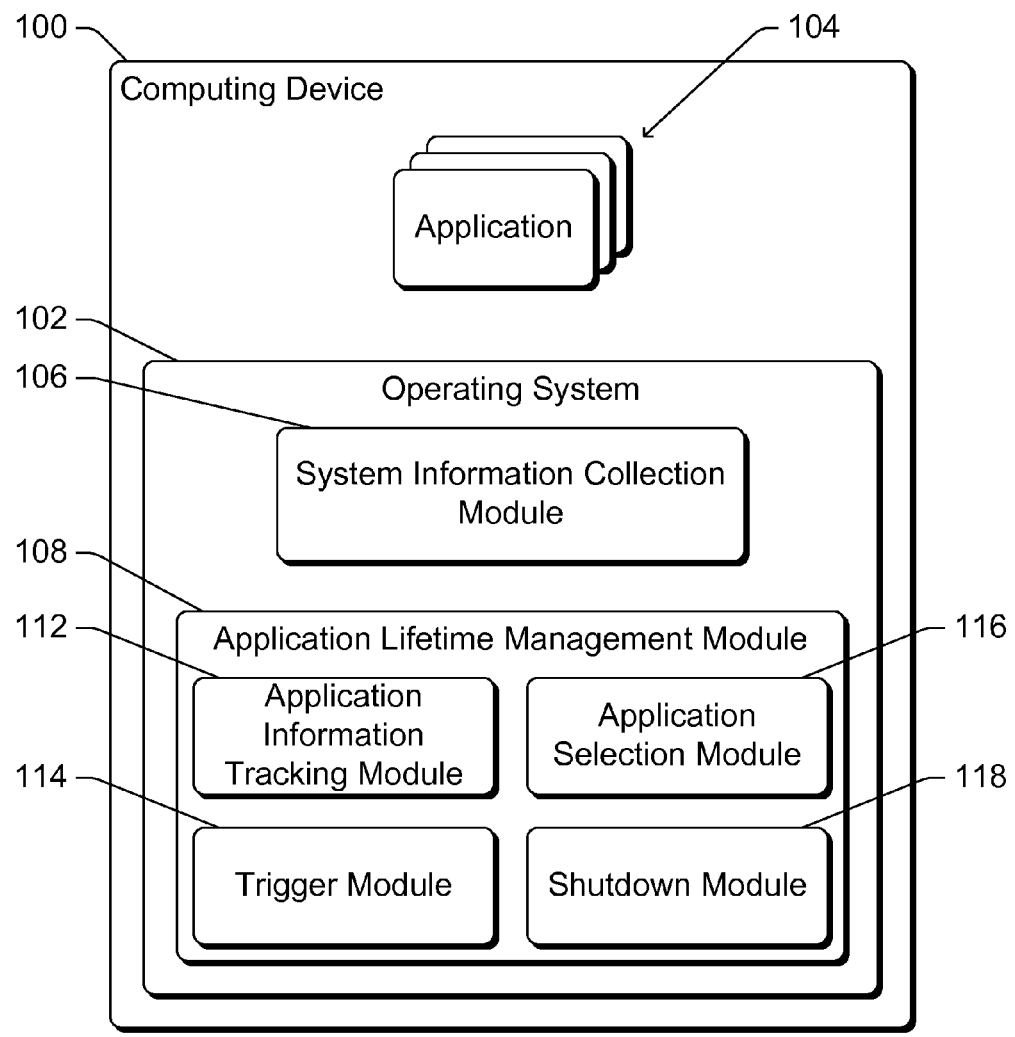
FIG. 1 illustrates an example computing device implementing the application lifetime management in accordance with one or more embodiments.

FIG. 1 illustrates an example computing device 100 implementing the application lifetime management in accordance with one or more embodiments. Computing device 100 can be a variety of different types of devices. For example, computing device 100 can be a desktop computer, a netbook or laptop computer, a notepad or tablet computer, a mobile station, an entertainment appliance, a set-top box communicatively coupled to a display device, a television, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 is powered by one or more power sources. These power sources can be an external power source or plug-in power supply, and when operating under power from such a power source computing device 100 is referred to as operating as a plugged-in system or device. These power sources can also be an internal power source such as a battery, and when operating under power from such a power source computing device 100 is referred to as operating as an on-battery system or device. Many types of devices can be plugged-in systems or on-battery systems at different times, depending on the power source that the device is operating under at any particular time. Other types of devices, however, can be only plugged-in systems (having no internal power source) or only on-battery systems (using no external power source).

Computing device 100 includes an operating system 102 and one or more applications 104. During operation, operating system 102 and applications 104 run on computing device 100, with operating system 102 managing applications 104. The management of applications 104 includes automatically shutting down one or more applications 104, as discussed in more detail below. The lifetime or life of an application 104 refers to the time period when the application is running, beginning when the application begins running and ending when the application is shut down.

Operating system 102 includes a system information collection module 106 and an application lifetime management module 108. Although system information collection module 106 and application lifetime management module 108 are illustrated as being part of operating system 102, alternatively one or both of module 106 and module 108 can be implemented separately from operating system 102.

System information collection module 106 collects various information regarding characteristics of applications 104 and/or the resources of computing device 100. The information regarding characteristics of applications 104 includes, for example, the age of each application 104. The age of an application 104 refers to how long ago (e.g., in terms of minutes, hours, days, etc.) the application 104 was last in the foreground. An application is in the foreground when it is being displayed or otherwise presented via a user interface of the computing device. Applications that have been minimized (and optionally applications having their display windows covered by the display windows of other applications) are not in the foreground, and are referred to as background applications. The information regarding characteristics of applications 104 can also include other properties of applications 104, such as a count of how many applications 104 are running on computing device 100.

Resources of computing device 100 include hardware and/or software resources of computing device 100, such as processors and/or processor cores, memory, network connections, and so forth. The information regarding characteristics of resources of computing device 100 includes, for example, information regarding the usage of resources of computing device 100, information describing properties of resources of computing device 100, and so forth. For example, characteristics of resources of computing device 100 can include how much of the processor (or a processor core) of computing device 100 is being used by all applications 104 combined, how much of each processor (or each processor core) of computing device 100 is being used by each individual application 104, an average lifetime of memory pages on a standby list, a type of network connection (e.g., whether a particular network connection is a cellular wireless connection, a wireless local area network (e.g., Wi-Fi) connection, etc.), and so forth.

Application lifetime management module 108 includes an application information tracking module 112, a trigger module 114, an application selection module 116, and a shutdown module 118. Application information tracking module 112 receives information regarding characteristics of applications 104 and/or the resources of computing device 100 from system information collection module 106. Trigger module 114 monitors the information received by application information tracking module 112 and determines when a threshold value associated with a particular characteristic of an application 104 and/or a resource of computing device 100 has been met. When a threshold value associated with a particular characteristic of application 104 and/or a resource of computing device 100 has been met, application selection module 116 selects one or more of applications 104 to shut down. Shutdown module 118 manages shutting down of the one or more applications selected by application selection module 116. Shutdown module 108 automatically shuts down the one or more applications selected by application selection module 116—user input or confirmation of the application to shut down need not be received for shutdown module 108 to shut down the selected one or more applications.

Application information tracking module 112 maintains information regarding various characteristics of applications 104 and/or the resources of computing device 100 from system information collection module 106. Application information tracking module 112 can request this information at regular or irregular intervals (e.g., every five seconds) from system information collection module 106, or alternatively can receive this information from module 106 in other manners (e.g., module 112 can register with module 106 to receive messages or other updates with the information).

In one or more embodiments, the information maintained by application information tracking module 112 includes the age of each application 104, processor (Central Processing Unit or CPU) core usage for each processor core in computing device 100, memory usage, storage device (e.g., hard disk) usage for each storage device in computing device 100, and network connection usage for each network connection used by computing device 100. The processor core usage is, for example, a combined usage of the processor core capacity (e.g., as a percentage of the full processor core capacity) by all applications 104, and/or the individual usage of the processor capacity (e.g., as a percentage of the full processor core capacity) by each application 104. Such processor core usage (whether combined applications or individual applications) can be determined, for example, by averaging the usage at particular intervals (e.g., every five seconds) over a particular number of intervals (e.g., 12 intervals).

The memory usage is, for example, a combined usage of the memory by all applications 104, and/or the individual usage of the memory by each application 104. Such memory usage (whether combined applications or individual applications) can be determined, for example, by determining the average lifetime of memory pages (e.g., over a particular time period, such as the previous minute, the life of the application, and so forth) on a standby list maintained by a memory manager of operating system 102. Such memory usage can also be determined in different manners, such as by determining an average number of memory pages (e.g., over a particular time period, such as the previous minute, the life of the application, and so forth) in a working set of memory pages for the application.

The storage device usage is, for example, a combined usage of the storage device by all applications 104, and/or the individual usage of the storage device by each application 104. The storage device usage (whether combined applications or individual applications) can be determined, for example, by averaging the frequency of accesses to the storage device (e.g. over a particular time period, such as the previous minute, the life of the application, and so forth). Such storage device usage can also be determined in different manners, such as by determining an amount of data transferred to and/or from the storage device (e.g. over a particular time period, such as the previous minute, the life of the application, and so forth).

The network connection usage is, for example, a combined usage of the network connection by all applications 104, and/or the individual usage of the network connection by each application 104. The network connection usage (whether combined applications or individual applications) can be determined, for example, by determining an average frequency of data being communicated (sent or received) over the network connection (e.g. over a particular time period, such as the previous minute, the life of the application, and so forth). Such network connection usage can also be determined in different manners, such as by determining an average amount of data being communicated (sent or received) over the network connection (e.g. over a particular time period, such as the previous minute, the life of the application, and so forth).

Trigger module 114 uses the information maintained by application information tracking module 112 to determine when a threshold value associated with a particular characteristic of an application 104 and/or a resource of computing device 100 has been met. In one or more embodiments, each characteristic for which information is maintained by application information tracking module 112 has its own associated threshold value (although it should be noted that multiple such threshold values can be the same value). The threshold values used by trigger module 114 can be pre-configured in trigger module 114, or alternatively can be provided to or otherwise obtained by trigger module 114 from another component or module (of computing device 100 or another device).

In one or more embodiments, a threshold value is met if the associated characteristic has a value that equals or exceeds the threshold value. In other embodiments, a threshold value can be met in other manners, such as if the associated characteristic has a value that exceeds the threshold value.

The threshold values can be set in a variety of different manners, and in one or more embodiments are set so as to maintain a high degree of system responsiveness as well as a long battery life. By shutting down certain applications when certain characteristics meet certain threshold values, application lifetime management module 108 attempts to maintain a high degree of system responsiveness as well as a long battery life. The particular threshold values can be set, for example, based on empirical analysis of the operation of different devices.

Table I includes examples of threshold values that can be used for particular characteristics of an application 104 and/or resource of computing device 100. It is to be appreciated that the examples included in Table I are examples, and that other threshold values and/or other characteristics can alternatively be used. Table I illustrates examples of threshold values associated with particular characteristics for plugged-in systems.

TABLE I

| Characteristic | Threshold Value |
| --- | --- |
| Application age | 3 hours (since the application was last in the foreground) |
| Processor usage | 75% (combined usage of the processor core capacity by all applications) for over 20 seconds; and/or 25% (usage of the processor core capacity by a single application) for over 20 seconds |
| Memory usage | Rapid churn/paging every 300 seconds (average lifetime of memory pages on the standby list maintained by the memory manager) |
| Disk usage | 75% (disk utilization by all processor cores on any single disk in the system) for over 20 seconds |

Table II includes additional examples of threshold values that can be used for particular characteristics of an application 104 and/or resource of computing device 100. It is to be appreciated that the examples included in Table II are examples, and that other threshold values and/or other characteristics can alternatively be used. Table II illustrates examples of threshold values associated with particular characteristics for on-battery systems.

TABLE II

| Characteristic | Threshold Value |
| --- | --- |
| Application age | 3 hours (since the application was last in the foreground) |
| Processor usage | 75% (combined usage of the processor core capacity by all applications) for over 5 seconds; and/or greater than 50% in intervals (record per-application processor core usage every 5 seconds in a rolling history of 12 intervals; trigger if utilization is non-zero in more than 50% of the intervals) |
| Memory usage | Rapid churn/paging every 300 seconds (average lifetime of memory pages on the standby list maintained by the memory manager) |
| Periodic disk usage | Non-zero activity in consecutive intervals (for each application, disk utilization is recorded in 5 minute intervals) |
| Periodic Network usage | Non-zero activity in consecutive intervals (for each application, network utilization is recorded in 5 minute intervals) |

Application selection module 116, in response to trigger module 114 determining that a threshold value has been met, selects one or more of applications 104 to shut down. This selection is based at least in part on the characteristic associated with the particular threshold value that was exceeded, and thus is also based at least in part on the particular threshold value that was exceeded. Application selection module 116 selects one or more of applications 104 to shut down when at least one threshold value is met. For example, application selection module 116 selects one or more of applications 104 to shut down if the threshold value for one resource (e.g., processor usage, memory usage, etc.) is met.

In one or more embodiments, application selection module 116 selects an application 104 to be shut down, and provides an indication of the selected application 104 to shutdown module 118. Shutdown module 118 shuts down the selected application 104 in any of a variety of different manners, such as by communicating a request to the selected application 104 to shut itself down, by communicating with other components or modules of operating system 102 to terminate execution of the selected application 104, and so forth. After the selected application 104 is shut down, trigger module 114 checks whether the threshold value that was previously met (and resulted in the selected application 104 being shut down) is still met. If the threshold value is still met then application selection module 116 selects another application 104 to be shut down. However, if the threshold value is not still met, then no additional applications need be shut down.

Alternatively, rather than selecting applications one by one, application selection module 116 can select multiple applications that are to be shut down. For example, application selection module 116 can determine a particular number of applications that are to be kept running based on a particular resource of computing device 100 (e.g., a particular amount of random access memory (RAM) in computing device 100, a particular number of processor cores in computing device 100, and so forth). One or more applications are selected so that only that particular number of applications are kept running.

Application selection module 116 can select which application 104 to shut down in a variety of different manners. In one or more embodiments, application selection module 116 selects an application to be shut down from a set of applications that includes applications running in the background. Applications running in the foreground (and thus possibly having displayed user interfaces that may be visible to the user) are not among the set from which an application to be shut down is selected. Whether an application is running in the foreground or background is a characteristic of the application that is maintained by, and can be retrieved by application lifetime management module 108 from, system information collection module 106.

Additionally, in one or more embodiments, the characteristics of the applications 104 and resources of computing device 100 maintained by application information tracking module 112 are obtained by application selection module 116. For the characteristic associated with the threshold value that was met, the set of applications running in the background is prioritized based on its value for that characteristic. Application selection module 116 selects, from the set of applications running in the background, the most offending application 104. The most offending application 104 is the application having a largest or highest value for that characteristic. For example, the application 104 having the highest usage of a resource, the application 104 having the largest age value (e.g., the application 104 having the oldest age), and so forth. The least offending application 104 would then be the application 104 having the lowest usage of the resource, the application having the youngest age, and so forth. For example, if the processor usage threshold is met, then application selection module 116 selects the application having the largest processor usage as the most offending application, and selects that application as the application to be shut down. E.g., if there are five running applications 104 having processor usages of 20%, 5%, 4%, 4%, and 3%, respectively, then the application having the processor usage of 20% is the application having the highest usage of the processor and is the application that is selected to be shut down. Alternatively, multiple applications can be selected to be shut down (e.g., the application having the processor usage of 20% and the application having the processor usage of 5%).

Alternatively, other techniques can be used to select, from the set of applications running in the background, the application to shut down. For example, the set of applications running in the background can be prioritized based on how frequently each application is used (e.g., what percentage of the time, while the application is running, the application is running in the foreground), based on how recently each application was last in the foreground, and so forth. The application selected as the application to shut down can be the application that is least frequently used, the application that was least recently in the foreground, and so forth.

Furthermore, in one or more embodiments one or more different types of applications are exempted from being selected by application selection module 116 as an application to be shut down. Application selection module 116 can be configured with, or alternatively obtain from another module or device, an indication of these one or more types of applications that are exempted from being selected by application selection module 116 as an application to be shut down. The particular types of applications that are exempted from being selected by application selection module 116 as an application to be shut down can be determined in different manners based on the desires of the designer of application selection module 116, or an administrator or user of computing device 100.

It should be noted that although various examples of characteristics of applications 104 and/or the resources of computing device 100 and associated threshold values are discussed herein, these are only examples and other characteristics can alternatively be used with the techniques discussed herein. For example, characteristics such as the number of applications 104 running on computing device 100 can be used, and trigger module 114 can determine that a threshold value has been met if at least a threshold number of applications 104 are running on computing device 100. By way of another example, different threshold values can be associated with different types of network connections, such as one threshold value for cellular wireless network connection usage and another threshold value for Wi-Fi network connection usage.

Figure 2:
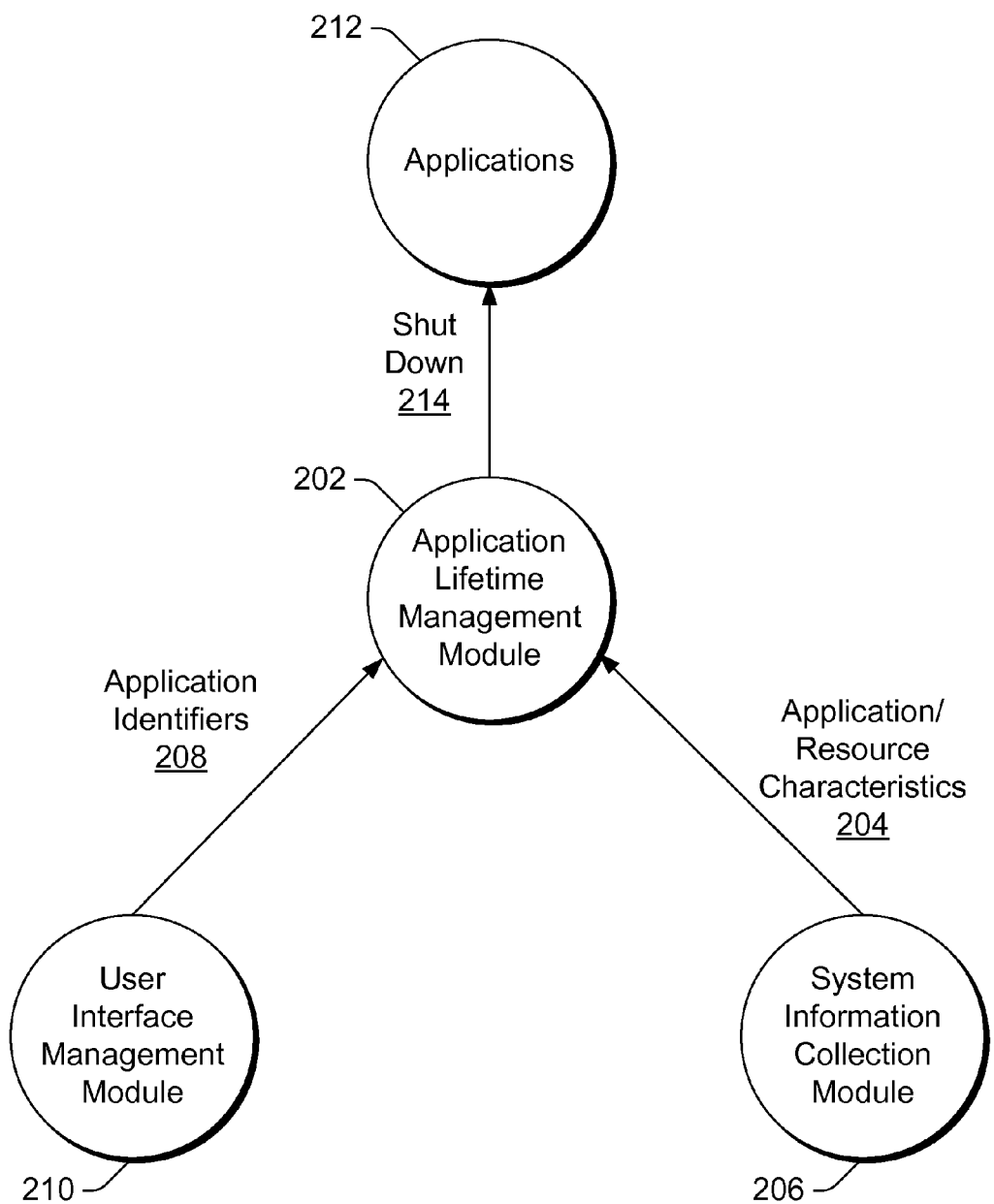
FIG. 2 illustrates an example system implementing the application lifetime management in accordance with one or more embodiments.

FIG. 2 illustrates an example system 200 implementing the application lifetime management in accordance with one or more embodiments. System 200 can be implemented by, for example, computing device 100 of FIG. 1. System 200 includes an application lifetime management module 202 that can be, for example, application lifetime management module 108 of FIG. 1.

Application lifetime management module 202 receives application and/or resource characteristics 204 from a system information collection module 206. These application and/or resource characteristics can be, for example, the information regarding various characteristics of applications 104 and/or the resources of computing device 100 received by application information tracking module 112 of FIG. 1. These application and/or resource characteristics 204 can be received via another component or module, such as system information collection module 106 of FIG. 1.

Application lifetime management module 202 also receives application identifiers 208 from a user interface management module 210. Application identifiers 208 identify applications that are, for example, currently running in the foreground. User interface management module 210 maintains a record of the applications that are currently running in the foreground, and provides the applications in that record as application identifiers 208. These application identifiers can be received via another component or module, such as system information collection module 106 of FIG. 1.

Application lifetime management module 202 uses one or more of the application/resource characteristics 204 and the application identifiers 208 to select one or more applications 212 to be shut down. These one or more applications can be selected in different manners as discussed above. These applications 212 can be, for example, one or more of applications 104 of FIG. 1. Application lifetime management module 202 communicates a shut down request or command 214 to the one or more applications 212.

Figure 3:
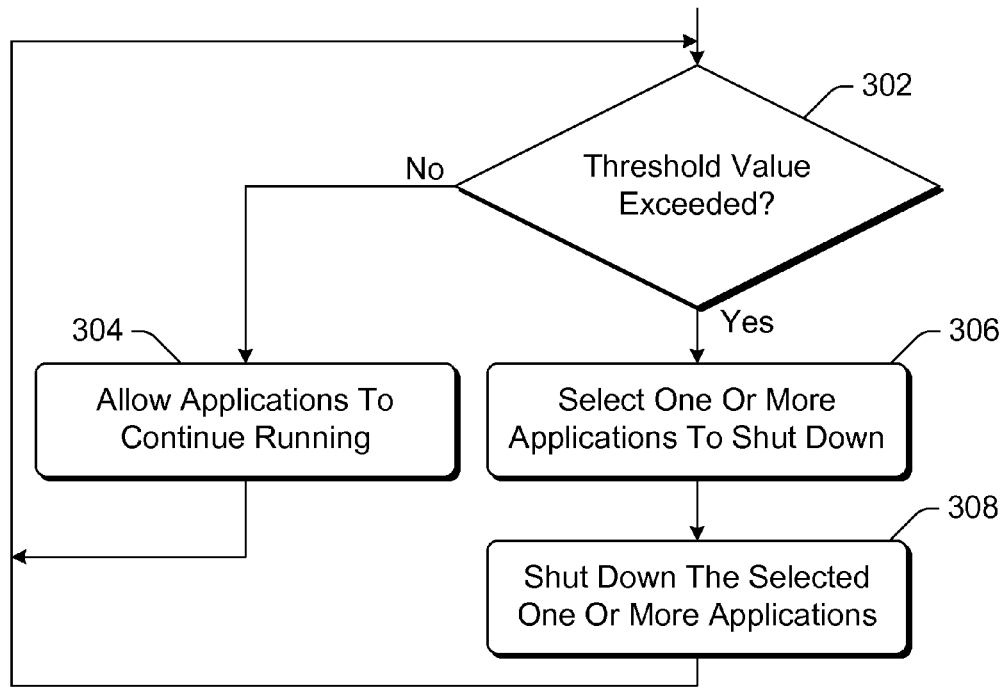
FIG. 3 is a flowchart illustrating an example process for a device implementing application lifetime management in accordance with one or more embodiments.

FIG. 3 is a flowchart illustrating an example process 300 for a device implementing application lifetime management in accordance with one or more embodiments. Process 300 is carried out by a computing device, such as computing device 100 of FIG. 1, and can be implemented in software, firmware, hardware, or combinations thereof. Process 300 is shown as a set of acts and is not limited to the order shown for performing the operations of the various acts. Process 300 is an example process for a device implementing application lifetime management; additional discussions of implementing application lifetime management are included herein with reference to different figures.

In process 300, a check is made as to whether a threshold value is exceeded (act 302). As discussed above, this threshold value is a threshold value associated with a characteristic of an application running on a computing device and/or a resource of computing device.

If no threshold value is exceeded, then the applications running on the computing device are allowed to continue running on the computing device (act 304). Act 302 is then repeated (e.g., at regular or irregular intervals).

However, if a threshold value is exceed, then one or more applications to shut down are selected (act 306). These one or more applications can be selected in different manners, as discussed above.

The one or more applications selected in act 306 are shut down (act 308). Act 302 is then repeated (e.g., at regular or irregular intervals).

Figure 4:
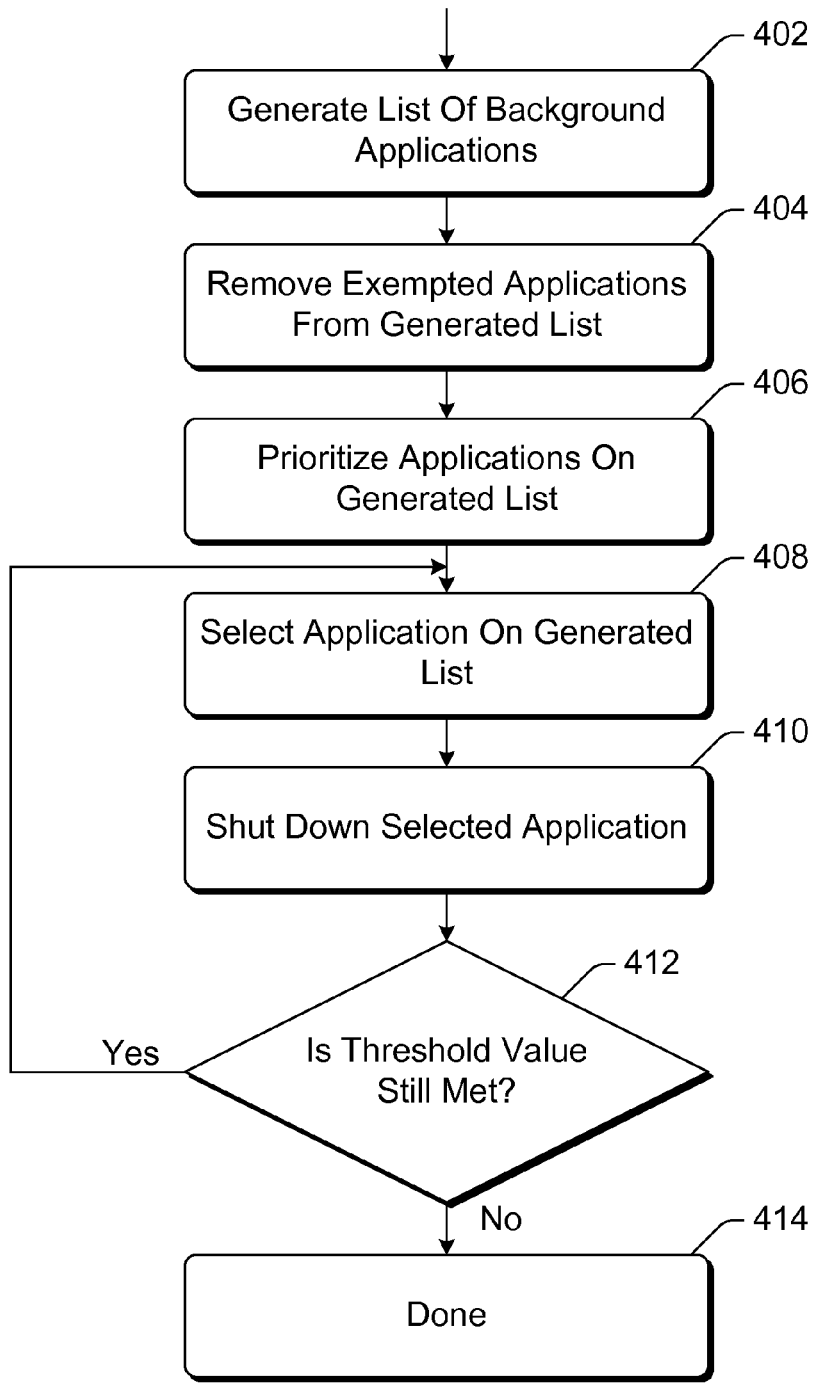
FIG. 4 is a flowchart illustrating an example process for selecting one or more applications to be shut down in accordance with one or more embodiments.

FIG. 4 is a flowchart illustrating an example process 400 for selecting one or more applications to be shut down in accordance with one or more embodiments. Process 400 is carried out by a computing device, such as computing device 100 of FIG. 1, and can be implemented in software, firmware, hardware, or combinations thereof. Process 400 is shown as a set of acts and is not limited to the order shown for performing the operations of the various acts. Process 400 is an example process for selecting one or more applications to be shut down; additional discussions of selecting one or more applications to be shut down are included herein with reference to different figures.

Process 400 is typically initiated in response to a threshold value associated with a characteristic of an application running on a computing device and/or a resource of computing device being met. In process 400, a list of background applications is generated (act 402). The background applications are applications that are running on the computing device in the background.

Optionally, one or more applications that are exempted from being shut down are removed from the generated list (act 404). Different types of applications can be exempted from being shut down, as discussed above.

The applications remaining on the generated list are prioritized (act 406). The applications can be prioritized in different manners, such as according to usage of a particular resource (e.g., the resource associated with the threshold value that was met), age, frequency of use, and so forth.

An application on the generated list is selected (act 408). The application selected in act 408 is the application that is prioritized the highest (e.g., has the highest usage of a resource, has the oldest age, has the lowest frequency of use, and so forth).

The selected application is shut down (act 410). The selected application can be shut down in different manners, as discussed above.

A check is then made as to whether the threshold value is still being met (act 412). If the threshold value is still being met, then process 400 returns to act 408 to select another application. Alternatively, process 400 can return to act 402 to re-generate the list of background applications.

If the threshold value is not still being met then process 400 is done (act 414). Additionally, if all applications that can be shut down (e.g., all background applications, all applications that are not exempted from being shut down, etc.) have been shut down, process 400 is done (act 414) even if the threshold value is still met.

Process 400 is discussed with reference to generating a list and removing from the list applications that are exempted from being shut down. Alternatively, a list of background applications can be generated and prioritized, an application on the generated list selected, and then the application shut down only if the selected application is not exempted from being shut down.

The techniques discussed herein support various usage scenarios. For example, if a particular background application is using a large amount of the capacity of the processor (or memory), that particular background application can be selected as the application to be shut down. Thus, a background application, which was not in the foreground and not being currently used by the user of device 100, is automatically shut down and the resources being used by that background application are freed up for other applications to use. Rather than simply shutting down the least recently used application, the application having a high probability of freeing up resources for other applications to use is the application that is shut down.

It should also be noted that the application lifetime management techniques discussed herein alleviate the user of some of the burden of managing multiple applications on his or her computing device. The user can run applications as he or she desires without concern for shutting down those applications when he or she is no longer using those applications. Rather, the application lifetime management techniques discussed herein automatically shut down the application for the user, taking care to shut down background applications rather than applications currently being used by the user.

Figure 5:
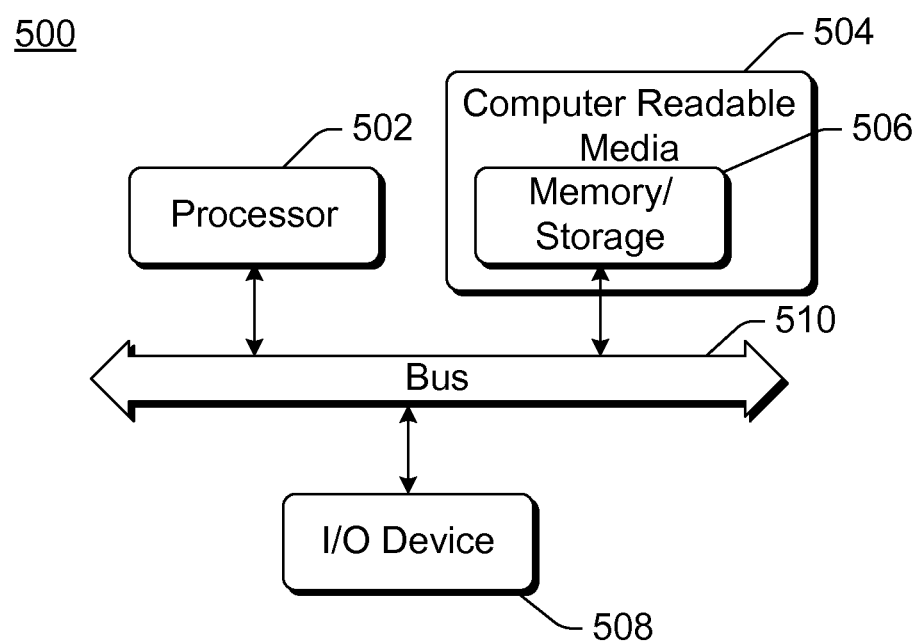
FIG. 5 illustrates an example computing device that can be configured to implement the application lifetime management in accordance with one or more embodiments.

FIG. 5 illustrates an example computing device 500 that can be configured to implement the application lifetime management in accordance with one or more embodiments. Computing device 500 can be, for example, computing device 100 of FIG. 1.

Computing device 500 includes one or more processors or processing units 502 (each of which can include one or more processor cores), one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the application lifetime management techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a computing device running multiple applications, the method comprising:
    determining multiple threshold values, each of the multiple threshold values being associated with either a characteristic of one of the multiple applications or a characteristic of a resource of the computing device;
    adjusting the multiple threshold values based at least in part on if the computing device is operating as a plugged-in system or an on-battery system;
    checking whether a threshold value of the multiple threshold values has been met, the threshold value associated with a periodic network usage amount of the computing device;
    allowing, if the threshold value has not been met, the multiple applications to continue running on the computing device; and
    if the threshold value has been met, then:
        selecting, based at least in part on the periodic network usage amount of the computing device, one or more of the multiple applications to shut down; and
        shutting down the one or more applications.

2. A method as recited in claim 1, further comprising:
    checking whether a threshold value associated with a usage of a processor core of the computing device by the multiple applications has been met; and
    if the threshold value associated with the usage of the processor core by the multiple applications has been met, selecting, based at least in part on the usage of the processor, one or more additional applications of the multiple applications to shut down and shutting down the one or more additional applications.

3. A method as recited in claim 1, further comprising:
    checking whether a threshold value associated with a usage of a processor core of the computing device by a single application of the multiple applications has been met; and
    if the threshold value associated with the usage of the processor core by the single application has been met, shutting down the single application.

4. A method as recited in claim 1, further comprising:
    checking whether a threshold value associated with a usage of memory of the computing device has been met; and
    if the threshold value associated with the usage of the memory has been met, selecting, based at least in part on the usage of the memory, one or more additional applications of the multiple applications to shut down and shutting down the one or more additional applications.

5. A method as recited in claim 1, further comprising:
    checking whether a threshold value associated with a usage of a storage device of the computing device has been met; and
    if the threshold value associated with the usage of the storage device has been met, selecting, based at least in part on the usage of the storage device, one or more additional applications of the multiple applications to shut down and shutting down the one or more additional applications.

6. A method as recited in claim 1, further comprising:
    checking whether a threshold value associated with an age of the one of the multiple applications has been met, wherein the age of the one of the multiple applications indicates how long ago the one of the multiple applications was last in the foreground; and
    if the threshold value associated with the age of the one of the multiple applications has been met, shutting down the one of the multiple applications.

7. A method as recited in claim 1, wherein the selecting one or more of the multiple applications to shut down comprises:
    identifying at least one of the multiple applications that is exempted from being shut down, wherein the at least one of the multiple applications includes applications that are running in the foreground; and
    selecting, as the one or more of the multiple applications to shut down, one or more applications other than the at least one of the multiple applications.

8. A method as recited in claim 1, further comprising:
    checking whether a threshold value associated with a resource of the computing device, different from the periodic network usage, has been met; and
    selecting one or more additional applications of the multiple applications having a largest usage of the resource and shutting down the one or more additional applications.

9. One or more computer storage memories having stored thereon multiple instructions that, when executed by one or more processors of a computing device, cause the one or more processors to perform operations comprising:
    generating a list of background applications running on the computing device;
    determining a threshold value associated with a periodic network usage of the computing device, the threshold value having a first threshold value if the computing device is operating as an on-battery system, and a second threshold value if the computing device is operating as a plugged-in system, the first threshold value and the second threshold value having different threshold values;
    prioritizing the background applications on the list, such that background applications that exceed a periodic network usage amount have a lower priority;
    selecting an application with a low priority on the list of background applications;
    automatically shutting down the selected application; and
    repeating the selecting of an application and shutting down the selected application until the periodic network usage of the computing device does not meet the threshold value determined by said determining.

10. One or more computer storage memories as recited in claim 9, wherein selecting the application on the list comprises selecting the application on the list having a largest periodic network usage amount.

11. One or more computer storage memories as recited in claim 9, wherein selecting the application comprises selecting multiple applications on the list of background applications, and wherein shutting down the selected application comprises shutting down the multiple selected applications.

12. One or more computer storage memories as recited in claim 9, wherein the background applications on the list are further prioritized based at least in part on usage of a processor core of the computing device.

13. One or more computer storage memories as recited in claim 9, wherein the background applications on the list are further prioritized based at least in part on usage of a storage device of the computing device.

14. One or more computer storage memories as recited in claim 9, wherein the threshold value is a third threshold value if the periodic network usage is on a cellular wireless network, and a fourth threshold value if the periodic network usage is on a Wi-Fi network, wherein the third threshold value and the fourth threshold value are different threshold values.

15. One or more computer storage memories as recited in claim 9, wherein the background applications on the list are further prioritized based at least in part on usage of memory of the computing device.

16. One or more computer storage memories as recited in claim 9, wherein the background applications on the list are further prioritized based at least in part on an age of the background applications, wherein the age of the background applications indicates how long ago the background applications were last in the foreground.

17. A method in a computing device running multiple applications, the method comprising:
    determining multiple threshold values including:
        a first threshold value associated with an age of one of the multiple applications,
        a second threshold value associated with usage of a processor core of the computing device,
        a third threshold value associated with usage of a storage device of the computing device, and
        a fourth threshold value associated with periodic network usage of the computing device;
    adjusting the multiple threshold values based at least in part on if the computing device is operating as a plugged-in system or an on-battery system;
    checking whether a threshold value of the multiple threshold values has been met;
    allowing, if none of the multiple threshold values has been met, the multiple applications to continue running on the computing device;
    if the first threshold value has been met, then selecting a first application of the multiple applications having an oldest age and shutting down the first application;
    if the second threshold value has been met, then selecting a second application of the multiple applications having a largest processor core usage and shutting down the second application;
    if the third threshold value has been met, then selecting a third application of the multiple applications having a largest storage device usage and shutting down the third application; and
    if the fourth threshold value has been met, then selecting a fourth application of the multiple applications having a largest periodic network usage amount and shutting down the fourth application.

18. A method as recited in claim 17, further comprising:
    running an empirical analysis on the computing device; and
    wherein the determining of the multiple threshold values is based at least in part on the empirical analysis.

19. A method as recited in claim 17, further comprising adjusting the fourth threshold value based at least in part on if the periodic network usage is on a cellular wireless network or if the periodic network usage is on a Wi-Fi network.

* * * * *